(12) United States Patent
Kito et al.

(10) Patent No.: US 12,500,419 B2
(45) Date of Patent: Dec. 16, 2025

(54) POWER SUPPLY SYSTEM AND POWER SUPPLY METHOD

(71) Applicant: HITACHI-GE NUCLEAR ENERGY, LTD., Ibaraki (JP)

(72) Inventors: Kazuaki Kito, Ibaraki (JP); Shunya Morita, Ibaraki (JP); Yukinori Katagiri, Tokyo (JP); Yuji Hosokawa, Ibaraki (JP)

(73) Assignee: HITACHI-GE NUCLEAR ENERGY, LTD., Ibaraki (JP)

( * ) Notice: Subject to any disclaimer, the term of this patent is extended or adjusted under 35 U.S.C. 154(b) by 0 days.

(21) Appl. No.: 18/843,731

(22) PCT Filed: Mar. 30, 2022

(86) PCT No.: PCT/JP2022/015878
§ 371 (c)(1),
(2) Date: Sep. 4, 2024

(87) PCT Pub. No.: WO2023/188081
PCT Pub. Date: Oct. 5, 2023

(65) Prior Publication Data
US 2025/0183666 A1    Jun. 5, 2025

(51) Int. Cl.
*H02J 3/18*    (2006.01)
*F03D 9/00*    (2016.01)

(52) U.S. Cl.
CPC ............... *H02J 3/18* (2013.01); *F03D 9/007* (2013.01); *F05B 2220/708* (2013.01)

(58) Field of Classification Search
CPC ...... H02J 3/18; F03D 9/00; F03D 9/007; F05B 2220/708
See application file for complete search history.

(56) References Cited

FOREIGN PATENT DOCUMENTS

| | | |
|---|---|---|
| CN | 110492601 A | 11/2019 |
| JP | 2015-2597 A | 1/2015 |
| JP | 2021-132472 A | 9/2021 |

OTHER PUBLICATIONS

International Search Report of PCT/JP2022/015878 dated Jun. 14, 2022.
Japanese Office Action received in corresponding Japanese Application No. 2024-510866 dated Sep. 2, 2025.

*Primary Examiner* — Robert L Deberadinis
(74) *Attorney, Agent, or Firm* — MATTINGLY & MALUR, PC

(57) ABSTRACT

Provided is a power supply system that contributes to stabilization of a power system, and the like. A power supply system includes a control unit that uses at least a part of generated power of a photovoltaic power plant and a wind power plant that generate power with asynchronous power supplies as in-plant power to be used for a motor and another load during normal operation of a nuclear power plant that generates power with a main generator that is a synchronous power supply. The control unit uses at least a part of the generated power of the photovoltaic power plant and the wind power plant as the in-plant power during the normal operation of the nuclear power plant to reduce an in-plant ratio in the nuclear power plant.

9 Claims, 3 Drawing Sheets

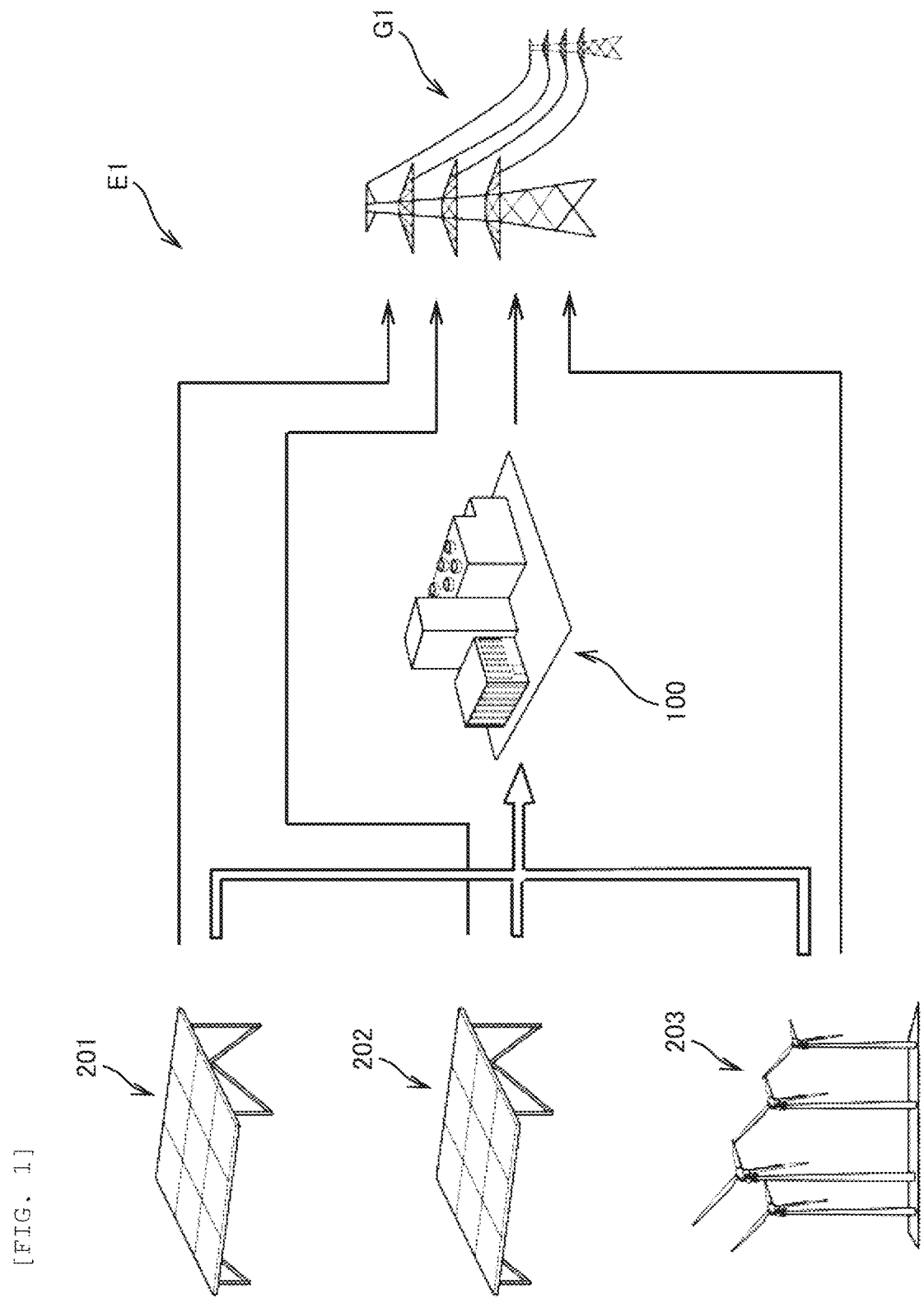
[FIG. 1]

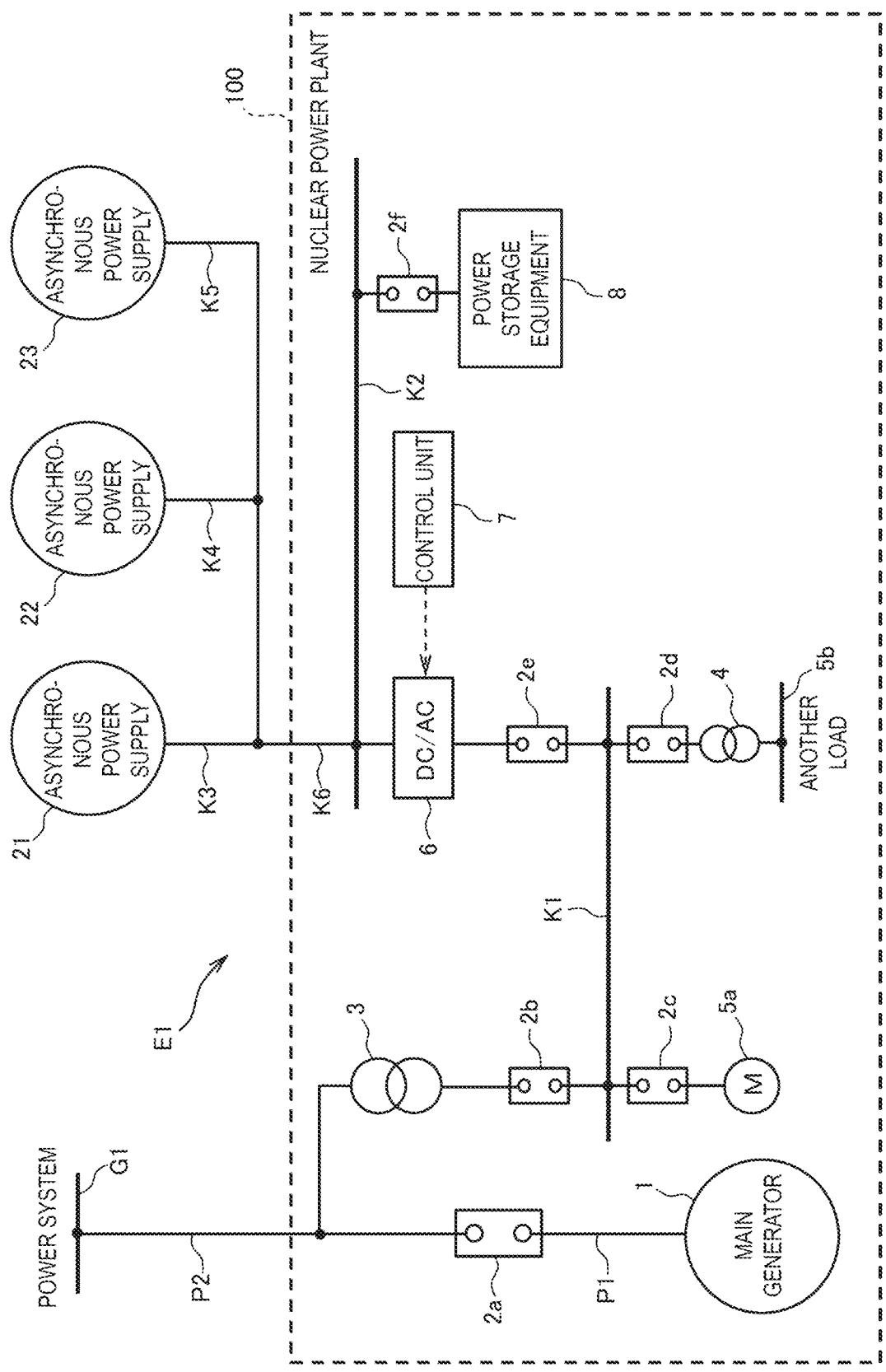
[FIG. 2]

[FIG. 3]
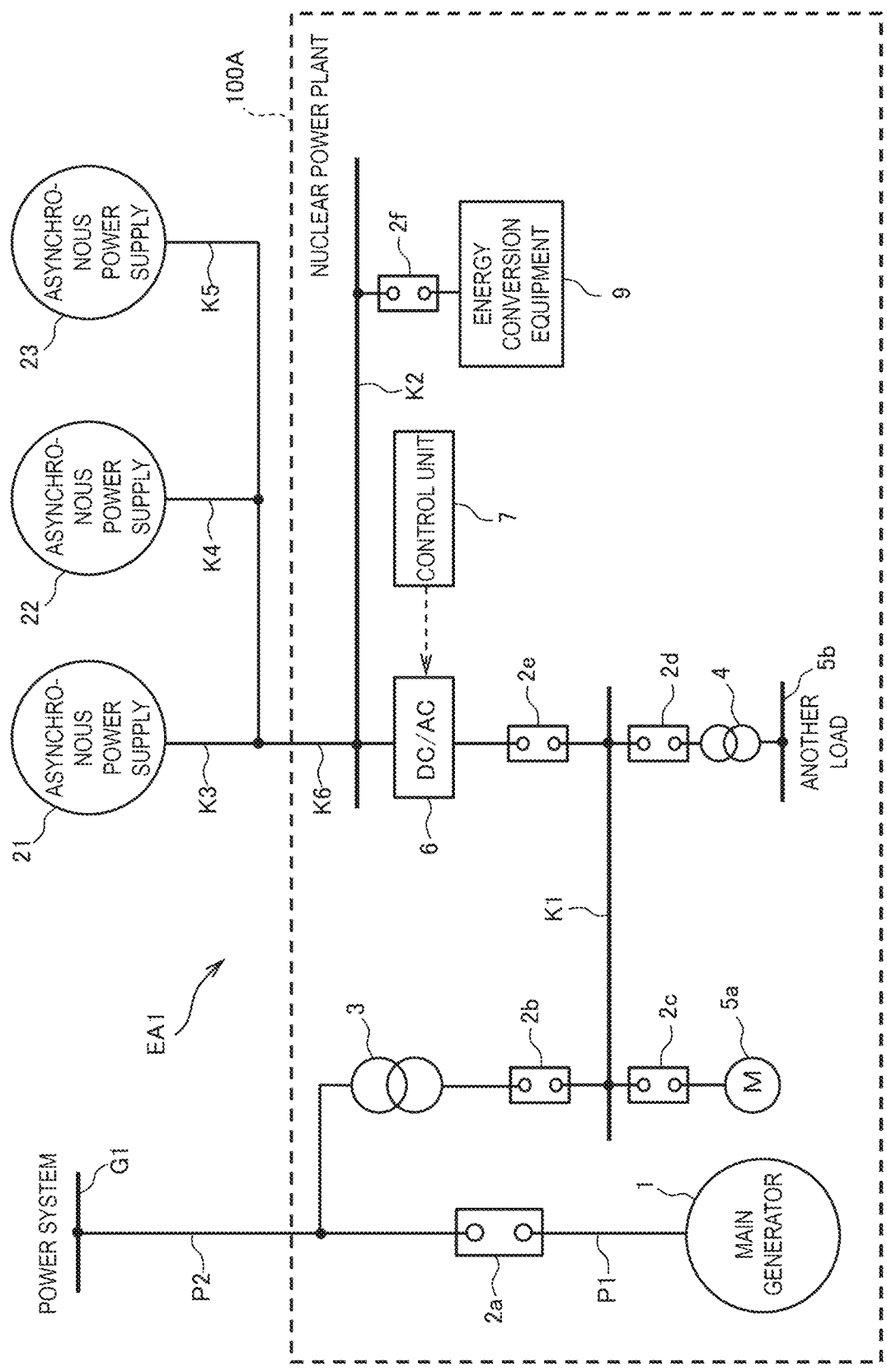

POWER SUPPLY SYSTEM AND POWER SUPPLY METHOD

TECHNICAL FIELD

The present invention relates to a power supply system and the like.

BACKGROUND ART

Regarding power supply to power generation equipment, for example, PTL 1 discloses that, when an emergency situation such as loss of an external power supply occurs in nuclear power generation equipment, generated power of photovoltaic power generation equipment and wind power generation equipment stored in power storage equipment in advance is supplied to the nuclear power generation equipment as an emergency power supply.

CITATION LIST

Patent Literature

PTL 1: JP2021-132472A

SUMMARY OF INVENTION

Technical Problem

Generally, power supplied from a generator coupled to a turbine to an external power system has so-called inertial force and synchronization force, and therefore often contributes to stabilization of the external power system. In the technique disclosed in PTL 1, during normal operation of the nuclear power generation equipment, an amount of power obtained by subtracting power to be consumed in the equipment is supplied from the nuclear power generation equipment to the external power system. There is room for further effectively using generated power (generated power having inertial force and synchronization force) of the nuclear power generation equipment, and stabilizing the external power system, but the technique is not disclosed in PTL 1.

Therefore, an object of the invention is to provide a power supply system that contributes to stabilization of a power system, and the like.

Solution to Problem

In order to solve the problems described above, a power supply system according to the invention includes: a control unit configured to use at least a part of generated power of one or more second power plants configured to generate power with asynchronous power supplies as in-plant power to be used for an in-plant load during normal operation of a first power plant that generates power with a synchronous power supply.

Advantageous Effects of Invention

According to the invention, it is possible to provide a power supply system that contributes to stabilization of a power system, and the like.

BRIEF DESCRIPTION OF DRAWINGS

FIG. 1 is an illustrative diagram of a power supply system according to a first embodiment.

FIG. 2 is a configuration diagram including a nuclear power plant of the power supply system according to the first embodiment.

FIG. 3 is a configuration diagram including a nuclear power plant of a power supply system according to a second embodiment.

DESCRIPTION OF EMBODIMENTS

First Embodiment

<Configuration of Power Supply System>

FIG. 1 is an illustrative diagram of a power supply system E1 according to a first embodiment.

Solid-line arrows in FIG. 1 indicate transmission of alternating-current power (alternating-current power transmission). In addition, a white arrow in FIG. 1 indicates transmission of direct-current power (direct-current power transmission). As shown in FIG. 1, the power supply system E1 includes a nuclear power plant 100 (first power plant), photovoltaic power plants 201 and 202 (second power plant), and a wind power plant 203 (second power plant).

The nuclear power plant 100 (first power plant) is a facility that generates power with a "synchronous power supply". Here, the "synchronous power supply" is a generator configured to convert kinetic energy of a turbine (not shown) into electric energy. Generated power (alternating-current power) of the nuclear power plant 100 is supplied to a power system G1. In FIG. 1, as an example of the "first power plant" that generates power with the "synchronous power supply", the nuclear power plant 100 is shown, but the "first power plant" is not limited thereto. For example, a thermal power plant or a hydroelectric power plant may be used as the "first power plant".

Since generated power of the "synchronous power supply" has a so-called inertial force, even if a voltage or a frequency is disturbed due to a malfunction of the power system G1 or the like, it is possible to prevent an instantaneous voltage drop and a rapid fluctuation in the frequency. In addition, since the "synchronous power supply" also has properties (synchronization force) of trying to be rotated at equal rotational speed as other synchronous power supplies connected to the power system G1, which contributes to stabilization of the power system G1.

The photovoltaic power plants 201 and 202 (second power plants) and the wind power plant 203 (second power plant) shown in FIG. 1 are facilities that generate power with "asynchronous power supplies". Here, the "asynchronous power supply" is power generation equipment that performs power conversion so as to follow a change in a voltage of the power system G1. In FIG. 1, as examples of the "second power plant" that generates power with the "asynchronous power supply", the photovoltaic power plants 201 and 202 and the wind power plant 203 that use renewable energy are shown, but the "second power plant" is not limited thereto. For example, as the "second power plant", power generation equipment for biomass power generation or temperature difference power generation may be used.

A part of generated power of the photovoltaic power plants 201 and 202 and the wind power plant 203 is supplied to the power system G1 as indicated by solid-line arrows in FIG. 1. That is, when the generated power of the photovoltaic power plants 201 and 202 and the wind power plant 203 is supplied to the power system G1, the generated power is converted into predetermined alternating-current power by an inverter (not shown) so as to follow the change in the voltage of the power system G1. As described above, since the "asynchronous power supply" has almost no inertial force and synchronization force as in the "synchronous power supply", as the number of "asynchronous power supplies" connected to the power system G1 increases, stability of the power system G1 tends to decrease.

In a related-art power supply system, during normal operation of a power plant that generates power with the "synchronous power supply", a part of generated power of the power plant is used for power supply to an in-plant load (pump, air-conditioning equipment, or the like: not shown). In this way, when a part of the generated power of the "synchronous power supply" is used for the in-plant load, the generated power supplied from the "synchronous power supply" to the power system G1 decreases accordingly.

Therefore, in the first embodiment, at least a part of the generated power of the photovoltaic power plants 201 and 202 (second power plants) and the wind power plant 203 (second power plant) that generate power with the "asynchronous power supply" is used by a control unit 7 (see FIG. 2) as in-plant power used by the in-plant load during normal operation of the nuclear power plant 100 (first power plant) that generates power with the "synchronous power supply". Accordingly, an "in-plant ratio" in the nuclear power plant 100 (first power plant) can be decreased. The "in-plant ratio" is a ratio of generated power used as the in-plant power of the nuclear power plant 100 (first power plant) to the generated power of the "synchronous power supply". As the "in-plant ratio" in the nuclear power plant 100 decreases, a ratio of the generated power supplied from the "synchronous power supply" of the nuclear power plant 100 to the power system G1 increases, and thus the stability of the power system G1 is enhanced.

As indicated by the white arrow in FIG. 1, a part of the generated power of the photovoltaic power plants 201 and 202 (second power plants) and the wind power plant 203 (second power plant) is supplied by direct-current power transmission to the nuclear power plant 100 (first power plant). The direct-current power supplied from the photovoltaic power plants 201 and 202 and the like to the nuclear power plant 100 is converted into alternating-current power by an inverter 6 shown in next FIG. 2, and the alternating-current power after the conversion is supplied to the in-plant load (a motor 5a or another load 5b: see FIG. 2) of the nuclear power plant 100.

FIG. 2 is a configuration diagram including the nuclear power plant 100 in the power supply system E1.

Three asynchronous power supplies 21 to 23 shown in FIG. 2 correspond to the power generation equipment of the photovoltaic power plants 201 and 202 (see FIG. 1) and the wind power plant 203 (see FIG. 1). As shown in FIG. 2, the nuclear power plant 100 includes a main generator 1 (synchronous power supply), circuit breakers 2a to 2f, transformers 3 and 4, a motor 5a (in-plant load), the another load 5b (in-plant load), the inverter 6, the control unit 7, and power storage equipment 8.

The main generator 1 is a generator that generates power by rotation of a turbine or the like (not shown). In the nuclear power plant 100, for example, in a case of a boiling water type light-water reactor, water is boiled by heat accompanying nuclear fission of uranium fuel or the like, a turbine (not shown) is rotated by energy of steam thereof, and power is generated by the main generator 1 coupled to the turbine. As the nuclear power plant 100, a pressurized water type light-water reactor or other types of power generation equipment may be used. Generated power (alternating-current power) of the main generator 1 is supplied to the power system G1 sequentially via a power transmission line P1, the circuit breaker 2a, and a power transmission line P2.

The circuit breaker 2a switches connection and disconnection between the main generator 1 and the power system G1. The transformer 3 is a device that adjusts a magnitude or the like of an alternating-current voltage when supplying a part of the generated power of the main generator 1 to the motor 5a or the another load 5b. A primary side of the transformer 3 is connected to the power transmission line P2, and a secondary side thereof is connected to a power line K1 via the circuit breaker 2b. The circuit breaker 2b switches connection and disconnection between the transformer 3 and the power line K1.

The motor 5a is one of the "in-plant loads" of the nuclear power plant 100, and is connected to the power line K1 via the circuit breaker 2c. The circuit breaker 2c switches connection and disconnection between the motor 5a and the power line K1.

The "in-plant load" is a device (a device that consumes in-plant power) used for operation of the nuclear power plant 100. In the nuclear power plant 100, for example, the "in-plant loads" include air-conditioning equipment (not shown), sensors (not shown), and a control device (not shown) in addition to a pump that circulates cooling water used to cool a fuel rod (not shown), and a pump (not shown) that circulates water so as to pass through a condenser (not shown). In FIG. 2, the in-plant loads are schematically shown as the motor 5a and the another load 5b.

The another load 5b is a predetermined device included in the "in-plant loads", and is connected to the power line K1 sequentially via the transformer 4 and the circuit breaker 2d. The transformer 4 is a device that adjusts a magnitude or the like of a voltage of predetermined alternating-current power (or alternating-current power supplied via the transformer 3) output from the inverter 6. A primary side of the transformer 4 is connected to the power line K1 via the circuit breaker 2d, and a secondary side thereof is connected to the another load 5b. The circuit breaker 2d switches connection and disconnection between the power line K1 and the transformer 4.

The asynchronous power supply 21 shown in FIG. 2 is, for example, a photovoltaic panel of the photovoltaic power plant 201 (see FIG. 1), and is connected to an input side of the inverter 6 sequentially via power transmission lines K3 and K6. The other asynchronous power supply 22 is, for example, a photovoltaic panel of the photovoltaic power plant 202 (see FIG. 1), and is connected to the input side of the inverter 6 sequentially via the power transmission lines K4 and K6. The remaining asynchronous power supply 23 is, for example, a generator of the wind power plant 203 (see FIG. 1), and is connected to the input side of the inverter 6 sequentially via power transmission lines K5 and K6. The wind power plant 203 (see FIG. 1) is provided with a converter (not shown) that converts alternating-current power into direct-current power.

Generated power (direct-current power) of each of the asynchronous power supplies 21 to 23 is input to the inverter 6 of the nuclear power plant 100 via the common power transmission line K6. When the common power transmission line K6 is used as described above, equipment cost required for the power transmission line can be reduced.

The inverter 6 is a power converter that converts the direct-current power supplied from the asynchronous power supplies 21 to 23 into alternating-current power. In the example in FIG. 2, the input side of the inverter 6 is connected to the power transmission line K6, and an output side thereof is connected to the power line K1 via the circuit breaker 2e. Although not shown, the inverter 6 has, for example, a configuration in which a first leg, a second leg, and a third leg in which two switching elements are connected in series are connected to one another in parallel. An intermediate terminal of the first leg is connected to a U-phase winding, an intermediate terminal of the second leg is connected to a V-phase winding, and an intermediate terminal of the third leg is connected to a W-phase winding. The configuration of the inverter 6 is an example, and is not limited thereto.

Although not shown, the control unit 7 includes electronic circuits such as a central processing unit (CPU), a read only memory (ROM), a random access memory (RAM), and various interfaces. A program stored in the ROM is read and loaded in the RAM, and the CPU executes various processes. The control unit 7 has a function of controlling on and off of the switching elements (not shown) of the inverter 6 in a predetermined manner. The control unit 7 may be incorporated into the inverter 6.

The circuit breaker 2e shown in FIG. 2 switches connection and disconnection between the inverter 6 and the power line K1. The power line K1 and the circuit breakers 2b, 2c, 2d, and 2e connected to the power line K1 may be provided on a predetermined power supply board (not shown). The power storage equipment 8 is equipment that stores power, and is connected to the power transmission line K6 via a power line K2. As the power storage equipment 8, for example, a secondary battery that can perform charge and discharge is used, but the invention is not limited thereto. In addition, an electric double-layer capacitor may be used as the power storage equipment 8. As shown in FIG. 2, the power storage equipment 8 is connected to the input side of the inverter 6 sequentially via the circuit breaker 2f and the power line K2. The circuit breaker 2f switches connection and disconnection between the power storage equipment 8 and the power line K2.

As described above, the alternating-current power transmission is performed from the nuclear power plant 100 (first power plant) to the power system G1. In addition, direct-current power transmission is performed from the photovoltaic power plants 201 and 202 (second power plants: see FIG. 1) and the wind power plant 203 (second power plant: see FIG. 1) to the nuclear power plant 100 (first power plant). When the direct-current power transmission is performed as described above, as compared with a case where the alternating-current power transmission is performed, power loss accompanying the power transmission can be reduced. In addition, even if the asynchronous power supplies 21 to 23 are provided at remote locations, the power can be transmitted to the nuclear power plant 100 with relatively small power loss. In addition, since it is not particularly necessary to separately provide inverters (not shown) each of which converts direct-current power into alternating-current power in the photovoltaic power plants 201 and 202 (see FIG. 1) and the like, the equipment cost can be reduced.

A method for power transmission from the photovoltaic power plants 201 and 202 (see FIG. 1) and the wind power plant 203 (see FIG. 1) to the nuclear power plant 100 is not limited to the direct-current power transmission, and for example, alternating-current power transmission may be performed. When the alternating-current power transmission is performed, as described above, the inverters (not shown) each of which converts the direct-current power into the alternating-current power are provided in the photovoltaic power plants 201 and 202 (see FIG. 1) and the like.

The power transmission lines K3 to K6 between the nuclear power plant 100 (first power plant) and the photovoltaic power plants 201 and 202 and the like (second power plants: see FIG. 1) are preferably dedicated lines. That is, the power transmission lines K3 to K6 that connect the nuclear power plant 100 to the photovoltaic power plants 201 and 202 and the like are preferably not connected to the power system G1. As described above, when the power transmission lines K3 to K6 are used as the dedicated lines, it is possible to simplify a process when supplying the generated power of the photovoltaic power plants 201 and 202 and the like to the in-plant loads of the nuclear power plant 100.

As shown in FIG. 2, a plurality of asynchronous power supplies 21 to 23 (that is, a plurality of second power plants) are connected to the nuclear power plant 100 (first power plant) via the power transmission lines K3 to K6. In the configuration, voltages when the direct-current power transmission is performed from the asynchronous power supplies 21 to 23 (that is, second power plants) to the nuclear power plant 100 (first power plant) are preferably equal. Accordingly, since the direct-current power transmission via the common power transmission line K6 is possible, a process on the nuclear power plant 100 side can be simplified, and cost required for the power transmission line can be reduced. The configuration of the nuclear power plant 100 shown in FIG. 2 is an example, and is not limited thereto.

<Process in Nuclear Power Plant>

For example, during the normal operation of the nuclear power plant 100, the circuit breakers 2a to 2f are in a closed state. A predetermined control device (not shown) may be used as a main body that opens and closes the circuit breakers 2a to 2f, or a person may open and close the circuit breakers 2a to 2f manually (including an operation on a button). As described above, the generated power of the main generator 1 is supplied to the power system G1 via the circuit breaker 2a.

A part of the generated power of the asynchronous power supplies 21 to 23 is supplied to the nuclear power plant 100 by the direct-current power transmission via the power transmission lines K3 to K6 (the white arrow in FIG. 1), and a remaining part of the generated power of the asynchronous power supplies 21 to 23 is supplied to the power system G1 by the alternating-current power transmission via other power transmission lines (the solid-line arrows in FIG. 1). The direct-current power supplied from the asynchronous power supplies 21 to 23 to the nuclear power plant 100 is converted into the alternating-current power by the inverter 6, and the alternating-current power is supplied to the in-plant loads such as the motor 5a and the another load 5b.

More specifically, the control unit 7 calculates momentary power consumption of the in-plant loads based on an operation state (for example, the normal operation or maintenance) of the nuclear power plant 100, specifications of the motor 5a and the another load 5b, and the like. Detected values of currents and voltages of the motor 5a and the another load 5b may be used appropriately. The control unit 7 controls the inverter 6 in a predetermined manner such that an output having a magnitude corresponding to the power consumption of the in-plant loads is obtained. The alternating-current power output from the inverter 6 is supplied to the motor 5a sequentially via the circuit breaker 2e, the power line K1, and the circuit breaker 2c, and is supplied to the another load 5b sequentially via the circuit breaker 2e, the power line K1, the circuit breaker 2d, and the transformer 4.

As described above, the control unit 7 controls the inverter 6 so as to use at least a part of the generated power of the photovoltaic power plants 201 and 202 and the like (second power plants: see FIG. 1) as the in-plant power to be used for the motor 5a (in-plant load) and the another load 5b (in-plant load) during the normal operation of the nuclear power plant 100 (first power plant). Accordingly, since the generated power of the asynchronous power supplies 21 to 23 is used as the in-plant power of the nuclear power plant 100, the generated power supplied from the main generator 1 that is a synchronous power supply to the power system G1 can be increased. That is, since a supply amount of the generated power having the inertial force and the synchronization force increases, the stability of the power system G1 is enhanced.

At least a part of the generated power of the asynchronous power supplies 21 to 23 including the photovoltaic power plants 201 and 202 and the like (second power plants: see FIG. 1) may be stored in the power storage equipment 8. The power of the power storage equipment 8 may be used as the in-plant power of the nuclear power plant 100 during the normal operation of the nuclear power plant 100 (first power plant). Also in the process, since a ratio (in-plant ratio) of the generated power used for power supply to the in-plant loads to the generated power of the main generator 1 that is the synchronous power supply is low, the power system G1 can be stabilized.

During the normal operation of the nuclear power plant 100, the main generator 1 that is the synchronous power supply may be electrically connected to the power system G1 via the circuit breaker 2a, and may also be electrically connected to the in-plant loads such as the motor 5a and the another load 5b via the circuit breaker 2b and the like. In this case, during the normal operation of the nuclear power plant 100, active power may be supplied from the asynchronous power supplies 21 to 23 to the in-plant loads, and at least reactive power may be supplied from the main generator 1 (or the power system G1) that is the synchronous power supply to the in-plant loads.

Therefore, the generated power of the asynchronous power supplies 21 to 23 often includes almost no reactive power. As described above, when the active power or the reactive power insufficient in the in-plant load such as the motor 5a is supplied from the main generator 1 (the power system G1 during maintenance of the main generator 1), the power can be sufficiently supplied to the in-plant load. When the active power or the reactive power is insufficient in the in-plant load, since the insufficient power is automatically supplied from the main generator 1 (or the power system G1) to the in-plant load, it is not particularly necessary for the control unit 7 to perform special control.

<Effects>

According to the first embodiment, at least a part of the generated power of the photovoltaic power plants 201 and 202 and the wind power plant 203 that generate power with the asynchronous power supplies 21 to 23 is used as the in-plant power during the normal operation of the nuclear power plant 100 that generates power with the synchronous power supply. Accordingly, the ratio (in-plant ratio) of the generated power consumed as the in-plant power to the generated power of the synchronous power supply can be reduced, and the ratio of the generated power supplied to the power system G1 can be increased. Therefore, since the supply amount of the generated power having the inertial force and the synchronization force increases, the power system G1 can be stabilized. In addition, even in a situation where the number of asynchronous power supplies such as renewable energy increases, it is possible to ensure the stability of the power system G1.

As power supplies that can be used by the nuclear power plant 100, there is the power supply from the power system G1 and the power supply from the asynchronous power supplies 21 to 23 in addition to the main generator 1 and the power storage equipment 8. Therefore, reliability related to the power supplies of the nuclear power plant 100 is enhanced. In addition, the power transmission lines P1 and P2 used for power transmission from the main generator 1 (synchronous power supply) to the power system G1 and the power transmission lines K3 to K6 used for power transmission from the asynchronous power supplies 21 to 23 to the nuclear power plant 100 are separated. Therefore, it is possible to prevent an influence e of voltage fluctuations caused by control of power conditioners (not shown) of the photovoltaic power plants 201 and 202 and the like from affecting the nuclear power plant 100.

Since the power storage equipment 8 is provided in the nuclear power plant 100, even if the generated power of the asynchronous power supplies 21 to 23 fluctuates, it is possible to supply the power from the power storage equipment 8 to the in-plant load such as the motor 5a so as to absorb the fluctuation.

Surplus power of the power supplied from the asynchronous power supplies 21 to 23 to the nuclear power plant 100 is stored in the power storage equipment 8. When the power supply from the asynchronous power supplies 21 to 23 is insufficient, or when an electricity sales price of the asynchronous power supplies 21 to 23 is high, the power storage equipment 8 can compensate for the in-plant power. Accordingly, since an amount of power supply from the main generator 1 to the power system G1 increases, profitability from selling electricity is increased. In addition, since it is not particularly necessary to complicate control in the nuclear power plant 100, the process can be simplified and cost can be reduced.

Second Embodiment

A second embodiment is different from the first embodiment in that energy conversion equipment 9 (see FIG. 3) instead of the power storage equipment 8 (see FIG. 2) is provided in a nuclear power plant 100A (see FIG. 3). Other configurations are the same as those of the first embodiment. Therefore, parts different from those of the first embodiment will be described, and description of repeated parts will be omitted.

FIG. 3 is a configuration diagram including the nuclear power plant 100A of a power supply system EA1 according to the second embodiment.

As shown in FIG. 3, the nuclear power plant 100A (first power plant) is provided with the energy conversion equipment 9. The energy conversion equipment 9 has a function of converting one of predetermined energy and electrical energy into the other of the predetermined energy and the electrical energy, and is electrically connected to the power transmission line K6 via the circuit breaker 2f. As the energy conversion equipment 9, for example, flywheel and battery are used in addition to pumped-storage power generation equipment and energy conversion equipment using hydrogen gas, but the energy conversion equipment 9 is not limited thereto.

At least a part of generated power of the asynchronous power supplies 21 to 23 of the photovoltaic power plants 201 and 202 and the like (second power plants: see FIG. 1) may be converted into predetermined energy, and stored in the energy conversion equipment 9. During normal operation of the nuclear power plant 100 (first power plant), the predetermined energy may be converted into power by the energy conversion equipment 9, and the power may be used as in-plant power of the nuclear power plant 100. Also in the process, since a ratio (in-plant ratio) of the generated power used for power supply to the in-plant loads to the generated power of the main generator 1 that is the synchronous power supply is low, the power system G1 can be stabilized.

<Effects>

According to the second embodiment, the nuclear power plant 100A includes the energy conversion equipment 9. Therefore, in addition to a case where malfunction occurs in the nuclear power plant 100A, even if the generated power of the asynchronous power supplies 21 to 23 fluctuates, it is possible to supply power from the energy conversion equipment 9 to the in-plant load such as the motor 5a so as to absorb the fluctuation.

<<Modification>>

The power supply system E1 and the like according to the invention have been described above using the embodiments, but the invention is not limited to the description, and various changes can be made.

For example, in each embodiment, a case has been described in which the control unit 7 uses a part of the generated power of the photovoltaic power plants 201 and 202 (second power plants) and the wind power plant 203 (second power plant) as the in-plant power during the normal operation of the nuclear power plant 100 (first power plant), but the invention is not limited thereto. For example, all the generated power of the photovoltaic power plants 201 and 202 and the like (second power plants) may be used as the in-plant power of the nuclear power plant 100 (first power plant).

In each embodiment, a case has been described in which the two photovoltaic power plants 201 and 202 (see FIG. 1) and the one wind power plant 203 (see FIG. 1) are used as the "second power plants", but the number and types of the "second power plants" can be appropriately changed. For example, the number of "second power plants" may be one, two, or four or more.

In each embodiment, a case has been described in which the control unit 7 (see FIG. 2) controls the inverter 6 (see FIG. 2), but the invention is not limited thereto. That is, the control unit 7 may control at least one of the circuit breakers 2a to 2f in addition to the inverter 6. In addition, in each embodiment, a case has been described in which the control unit 7 is provided in the nuclear power plant 100, but the invention is not limited thereto. For example, a server (not shown) provided outside the nuclear power plant 100 may perform at least a part of the function of the control unit 7.

In each embodiment, a case has been described in which the "first power plant" that generates power with the synchronous power supply is the nuclear power plant 100 (see FIG. 1), but the invention is not limited thereto. For example, a thermal power plant or a hydroelectric power plant may be used as the "first power plant".

In addition, in each embodiment, a case has been described in which the "second power plants" that generate power with the asynchronous power supplies 21 to 23 (see FIG. 2) are the photovoltaic power plants 201 and 202 (see FIG. 1) and the wind power plant 203 (see FIG. 1), but the invention is not limited thereto. For example, power generation equipment of biomass power generation and temperature difference power generation may be used as the "second power plants".

The embodiments have been described in detail in order to describe the invention in an easy-to-understand manner, and are not limited to necessarily including all the described configurations. In addition, it is possible to add, delete, or replace some of the configurations of the embodiments with other configurations. In addition, mechanisms and configurations described above indicate what is considered to be necessary for description, and not all mechanisms and configurations are necessarily shown on a product.

In addition, power lines and signal lines indicate what is considered to be necessary for description, and not all power lines and signal lines are necessarily shown on a product. Actually, it may be considered that almost all the configurations are connected to one another.

REFERENCE SIGNS LIST

1: main generator (synchronous power supply)
2a, 2b, 2c, 2d, 2e, 2f: circuit breaker
3: transformer
4: transformer
6: inverter
7: control unit
5a: motor (in-plant load)
5b: another load (in-plant load)
8: power storage equipment
9: energy conversion equipment
21, 22, 23: asynchronous power supply
100, 100A: nuclear power plant (first power plant)
201, 202: photovoltaic power plant (second power plant)
203: wind power plant (second power plant)
E1, EA1: power supply system
G1: power system
K3, K4, K5, K6: power transmission line
P1, P2: power transmission line

The invention claimed is:

1. A power supply system comprising:
a control unit configured to use at least a part of generated power of one or more second power plants configured to generate power with asynchronous power supplies as in-plant power to be used for an in-plant load during normal operation of a first power plant that generates power with a synchronous power supply, wherein
the synchronous power supply is electrically connected to a power system, and is also electrically connected to the in-plant load, and
during the normal operation of the first power plant, active power is supplied from the asynchronous power supplies to the in-plant load, and when reactive power is insufficient in the in-plant load, an amount of insufficiency of the reactive power is supplied from the synchronous power supply or the power system to the in-plant load.

2. The power supply system according to claim 1, wherein the control unit uses at least a part of the generated power of the second power plants as the in-plant power during the normal operation of the first power plant to decrease an in-plant ratio in the first power plant, and
the in-plant ratio is a ratio of the generated power used as the in-plant power to generated power of the synchronous power supply.

3. The power supply system according to claim 1, wherein a power transmission line that connects the first power plant to the second power plants is not connected to the power system.

4. The power supply system according to claim 1, wherein alternating-current power transmission is performed from the first power plant to the power system, and
direct-current power transmission is performed from the second power plants to the first power plant.

5. The power supply system according to claim 4, wherein the plurality of second power plants are connected to the first power plant via a power transmission line, and voltages of the each second power plant when direct-current power transmission is performed from the second power plants to the first power plant are equal.

6. The power supply system according to claim 1, further comprising:
a power storage equipment configured to be electrically connected to a power transmission line between the first power plant and the second power plants, wherein
at least a part of the generated power of the second power plants is stored in the power storage equipment, and
during the normal operation of the first power plant, the power of the power storage equipment is used as the in-plant power.

7. The power supply system according to claim 1, further comprising:
an energy conversion equipment configured to be electrically connected to a power transmission line between the first power plant and the second power plants, wherein
at least a part of the generated power of the second power plants is converted into predetermined energy and stored in the energy conversion equipment, and
during the normal operation of the first power plant, the predetermined energy is converted into power by the energy conversion equipment, and the power is used as the in-plant power.

8. The power supply system according to claim 1, further comprising:
an inverter configured to be electrically connected to a power transmission line between the first power plant and the second power plants, wherein
the control unit controls the inverter such that at least a part of the generated power of the second power plants is used as the in-plant power during the normal operation of the first power plant.

9. A power supply method comprising:
using at least a part of generated power of one or more second power plants that generate power with asynchronous power supplies as in-plant power to be used for an in-plant load during normal operation of a first power plant that generates power with a synchronous power supply, wherein
the synchronous power supply is electrically connected to a power system, and is also electrically connected to the in-plant load, and
during the normal operation of the first power plant, active power is supplied from the asynchronous power supplies to the in-plant load, and when reactive power is insufficient in the in-plant load, an amount of insufficiency of the reactive power is supplied from the synchronous power supply or the power system to the in-plant load.

* * * * *